(12) United States Patent
Alruwaili et al.

(10) Patent No.: US 11,887,801 B2
(45) Date of Patent: Jan. 30, 2024

(54) ELECTRONIC ELECTRICAL BREAKER

(71) Applicant: SAUDI ELECTRICITY COMPANY, Riyadh (SA)

(72) Inventors: Hani Shutaywi N. Alruwaili, Riyadh (SA); Mohammad Gady N. Arrowaili, Riyadh (SA)

(73) Assignee: SAUDI ELECTRICITY COMPANY, Riyadh (SA)

( * ) Notice: Subject to any disclaimer, the term of this patent is extended or adjusted under 35 U.S.C. 154(b) by 219 days.

(21) Appl. No.: 17/207,951

(22) Filed: Mar. 22, 2021

(65) Prior Publication Data

US 2022/0301803 A1   Sep. 22, 2022

(51) Int. Cl.
*H01H 89/08* (2006.01)
*H02H 1/00* (2006.01)
*H01H 83/20* (2006.01)
*H01H 89/06* (2006.01)

(52) U.S. Cl.
CPC ............ *H01H 89/08* (2013.01); *H01H 83/20* (2013.01); *H02H 1/0061* (2013.01); *H01H 2089/065* (2013.01)

(58) Field of Classification Search
CPC ........ H03F 1/0205; H03F 1/26; H03F 1/0211; H03F 1/32; H03F 1/565; H03F 1/0222; H03F 3/45188; H03F 3/211; H03F 3/245; H03F 3/195; H04B 1/0458; H04B 1/44; H04B 1/18; H04B 1/3833; H04B 1/40; H04B 1/3838; H04B 1/10; H04B 1/525
See application file for complete search history.

(56) References Cited

U.S. PATENT DOCUMENTS

| | | | |
|---|---|---|---|
| 2010/0124891 A1* | 5/2010 | Lin | H04B 1/525 455/143 |
| 2011/0291813 A1 | 12/2011 | Jansma | |
| 2018/0019602 A1* | 1/2018 | Hasan | H03K 17/687 |
| 2020/0050753 A1* | 2/2020 | Davis | G06F 21/53 |
| 2020/0059081 A1 | 2/2020 | Freeman et al. | |

FOREIGN PATENT DOCUMENTS

| | | |
|---|---|---|
| CN | 206877180 U | 1/2018 |
| KR | 10-2005-0036325 | 4/2005 |

OTHER PUBLICATIONS

Isa, et al.; Implementation of Microcontroller Based Distance Relay; EJECE, European Journal of Electrical and Computer Engineering, vol. 2, No. 5, Jul. 2018; 6 Pages.

* cited by examiner

*Primary Examiner* — Bryan R Perez
(74) *Attorney, Agent, or Firm* — Oblon, McClelland, Maier & Neustadt, L.L.P.

(57) ABSTRACT

A remotely controlled electronic circuit breaker including wireless communication circuit which receives control signals from a mobile app. A power-management module is configured to switch a circuit ON or OFF based on the control signal. A method for remotely controlling an electronic circuit comprises receiving, by an electronic circuit breaker, a control signal from a native mobile app, and activating a relay to switch a circuit ON or OFF based on the control signal. A system for remotely controlling an electronic circuit, comprises a smart communication device including a native mobile app for controlling the electronic circuit and an electronic circuit breaker wirelessly connected to receive at least one control signal from the smart communication device, and switch the electronic circuit breaker ON or OFF based on the control signal.

13 Claims, 14 Drawing Sheets

ELECTRONIC ELECTRICAL BREAKER

BACKGROUND

Technical Field

The present disclosure is directed to an electronic circuit breaker that can be controlled by a mobile app.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A circuit breaker is a device which provides on/off control to an electrical line. The electrical line may be connected to a load, such as an appliance, lighting, machinery, or the like.

Manually turning off a circuit breaker may not be possible in an emergency situation, such as fire, smoke, bad weather or the like. Wireless circuit breaker control has been a topic of interest in the last decades. Various solutions have been proposed, such as control of a circuit breaker controller by Bluetooth or low range communication. The circuit breaker controller turns on or off the circuit breakers in a circuit panel (See: US 2020/0059081 A1, incorporated herein by reference in its entirety). However, the circuit breaker itself does not communicate remotely, instead the circuit breaker controller handles the communication.

A remote control circuit breaker panel has been proposed which controls a plurality of circuit breakers. The panel communicates with a remote operator to receive communications to turn off a particular circuit breaker. A microprocessor in the panel handles the communications and turns a circuit breaker off or on (See: KR20050036325A, incorporated herein by reference in its entirety). However, this reference refers to control of a circuit breaker panel, but does not mention an individual circuit breaker which is wirelessly connected to a remote controller.

Each of the aforementioned remote controllers suffers from one or more drawbacks hindering their adoption. Accordingly, it is one object of the present disclosure to provide methods and systems for remote circuit breaker control built into each circuit breaker, which receives control signals from a mobile app or low range communications between a mobile communications device and the circuit breaker. Remote control by a native web app downloaded to a mobile communications device can be used when an interaction with the circuit is dangerous or not possible, where control from a safe distance is required.

SUMMARY

In an exemplary embodiment, an electronic circuit breaker is described comprising a circuit breaker, a circuit board including a wireless communication circuit including a plurality of antennas configured to receive a control signal, the antennas including cellular, Global System for Mobile Communications (GSM), Wi-Fi and dual-mode low range antennas, a power amplifier, a low-noise receive amplifier, a plurality of frequency filters, receiving and transmitting circuitry, a microprocessor connected to the wireless communication circuit and configured to receive the control signal and generate a trigger signal, a power supply circuit connected to the microprocessor, the power supply circuit including a first capacitor and a second capacitor, a relay connected to the power supply circuit, wherein the relay is configured to receive the trigger signal from the microprocessor and turn the circuit breaker ON or OFF based on the control signal.

In another exemplary embodiment, a method for remotely controlling an electronic circuit breaker by a native mobile app registered with the electronic circuit breaker is described, comprising, receiving, by a wireless communication circuit of the electronic circuit breaker, a control signal from the native mobile app to change the operational status of the electronic circuit breaker, transmitting the control signal to a microprocessor, determining, by the microprocessor, the operational status of the circuit breaker, generating a trigger signal by the microprocessor, and activating a relay to change the operational status based on the control signal.

In another exemplary embodiment, a system for remotely controlling an electronic circuit breaker is described, comprising a smart communication device including a native mobile application, an electronic circuit breaker registered with the native mobile application, the electric load connected to the electronic circuit breaker, wherein the electronic circuit breaker includes a circuit breaker connected to an electric load, a circuit board including, a wireless communication circuit including a plurality of antennas configured to receive a control signal from the native mobile app, the antennas including cellular, Global System for Mobile Communications (GSM), Wi-Fi and dual-mode low range antennas, a power amplifier, a low-noise receive amplifier, a plurality of frequency filters, receiving and transmitting circuitry, a microprocessor connected to the wireless communication circuit and configured to receive the control signal and generate a trigger signal, a power supply circuit connected to the microprocessor, the power supply circuit including a first capacitor and a second capacitor configured to protect the power supply circuit from sudden changes in voltage, a relay connected to the power supply circuit, wherein the relay is configured to receive the trigger signal from the microprocessor and generate a magnetic force to turn the circuit breaker ON or OFF based on the control signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
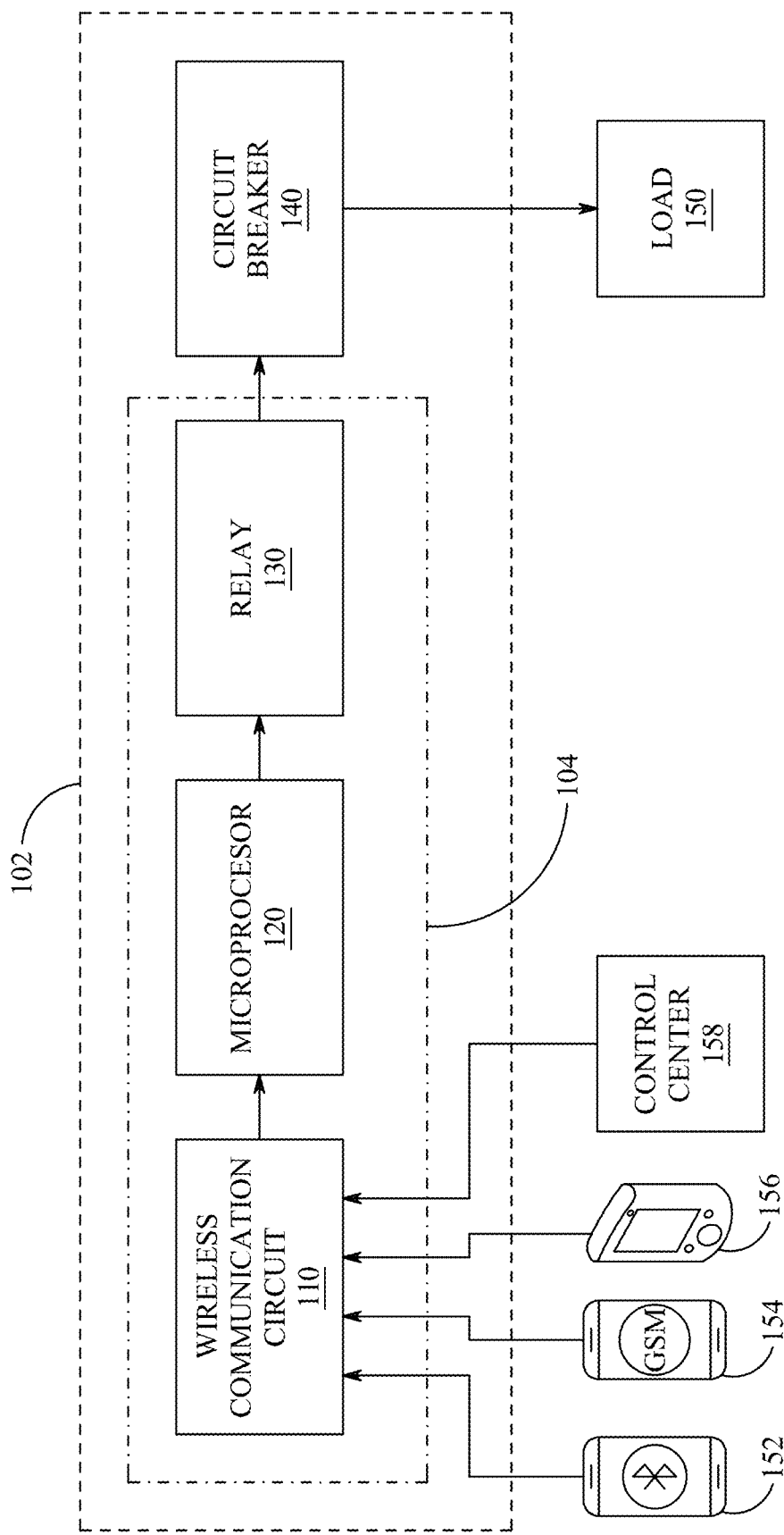
FIG. 1 is an overview of the electronic circuit breaker system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure describe an electronic circuit breaker comprising a microprocessor including: a plurality of antennas configured to receive a control signal, a plurality of antenna switches, wherein an antenna switch is connected to each antenna, an RF balun, a power amplifier, a low-noise receive amplifier, a plurality of frequency filters, at least one power-management module, a relay configured to receive a signal from the microprocessor and switch a circuit on or off based on the control signal. A wireless communication circuit is connected to the antennas to receive a control signal from a mobile device including a native app. Alternatively, the mobile device may communicate with the wireless communication circuit by low range communications. A method for remotely controlling an electronic circuit, comprises receiving, by an electronic circuit breaker, a control signal from a native mobile app and activating a relay to switch a circuit on or off based on the control signal. Further described are a system for remotely controlling an electronic circuit, comprising a smart communication device including a native mobile app for controlling the electronic circuit and an electronic circuit breaker wirelessly connected to receive at least one control signal from the smart communication device, a relay configured to switch a circuit connected to the electronic circuit breaker on or off based on the control signal.

Aspects of the present disclosure describe an electronic circuit containing a microprocessor that wirelessly controls a circuit breaker or a contactor to disconnect or connect the power service. The electronic circuit breaker may be used by electricity companies, individual homes or any other building to control its loads. The electronic circuit breaker may control the remote operation of the main breaker or branch breakers.

The electronic circuit breaker is easy to install and use. Also, it enables fast control of electrical loads.

Advantages of the electronic circuit breaker include:

A. Control from a distance by SMS. In an example, during the coronavirus pandemic this control could be used to enable and disable the circuit from a distance, rather than entering a building to physically turn a circuit breaker on or off.

B. Protecting technicians from the danger of manipulating the circuit by enabling the technicians to disable and/or enable the circuit from a distance.

The electronic circuit breaker includes an electronic circuit containing a microprocessor that wirelessly controls a circuit breaker or a contactor to disconnect or connect the power service.

In aspects of the present disclosure, the electronic circuit breaker is controlled by a mobile device of a customer or by a control center. The mobile device or control center may include a native computer application which presents an interface for sending control signals to the electronic circuit breaker. A privacy or security code can be sent by the control center when dealing with companies or by the mobile device of a customer, where the privacy code is transmitted through communication between the mobile and the wireless communication device of the electronic breaker. The customer may have a native computer application downloaded to the mobile device which displays the circuit breaker or the appliance connected to the circuit breaker. The customer may touch an icon of the circuit breaker or the connected load to select and activate control of the circuit breaker. The wireless communication device of the electronic circuit breaker may receive a control signal or an SMS signal which is interpreted by the microprocessor of the electronic circuit breaker to generate a control signal.

FIG. 1 illustrates an overview of the electronic circuit breaker system. The electronic circuit breaker 102 includes circuitry including a wireless communication circuit 110, a microprocessor 120 connected to the wireless communication circuit and a relay 130 connected to the microprocessor. The relay 130 is connected to a circuit breaker 140, which may be connected to a load 150. The wireless communication circuit 110 may receive a code and a control signal from wireless devices (152, 154, 156) or from a control center 158. The control center 158 may communicate with the wireless devices (152, 154, 156) to provide a code for access to the electronic circuit breaker or the code may be generated internally by the native mobile app or the user. In FIG. 1, wireless device 152 is shown communicating by low range communications in the frequency range of 2400 MHz to 2483.5 MHz, such as Bluetooth™. Wireless device 154 is a device using a Global System for Mobile Communications (GSM)™ standard and may communicate via short messaging service (SMS). Wireless device 156 is a personal mobile device and may be a smart phone or a tablet. Wireless device 156 may communicate with the electronic circuit breaker 102 through a wireless communication channel or by low range communications. The wireless devices (152, 154, 156) each have downloaded a native web application which provides an interface for communicating with the electronic circuit breaker 102. The wireless device may be a smartphone, tablet, personal computer connected to a hotspot, or the like.

The electronic circuit breaker 102 includes:
1. An electronic circuit board 104 that acts as a controller for the power restoration.
2. A circuit breaker 140 which receives a signal from the controller to perform the power restoration.

Figure 2A:
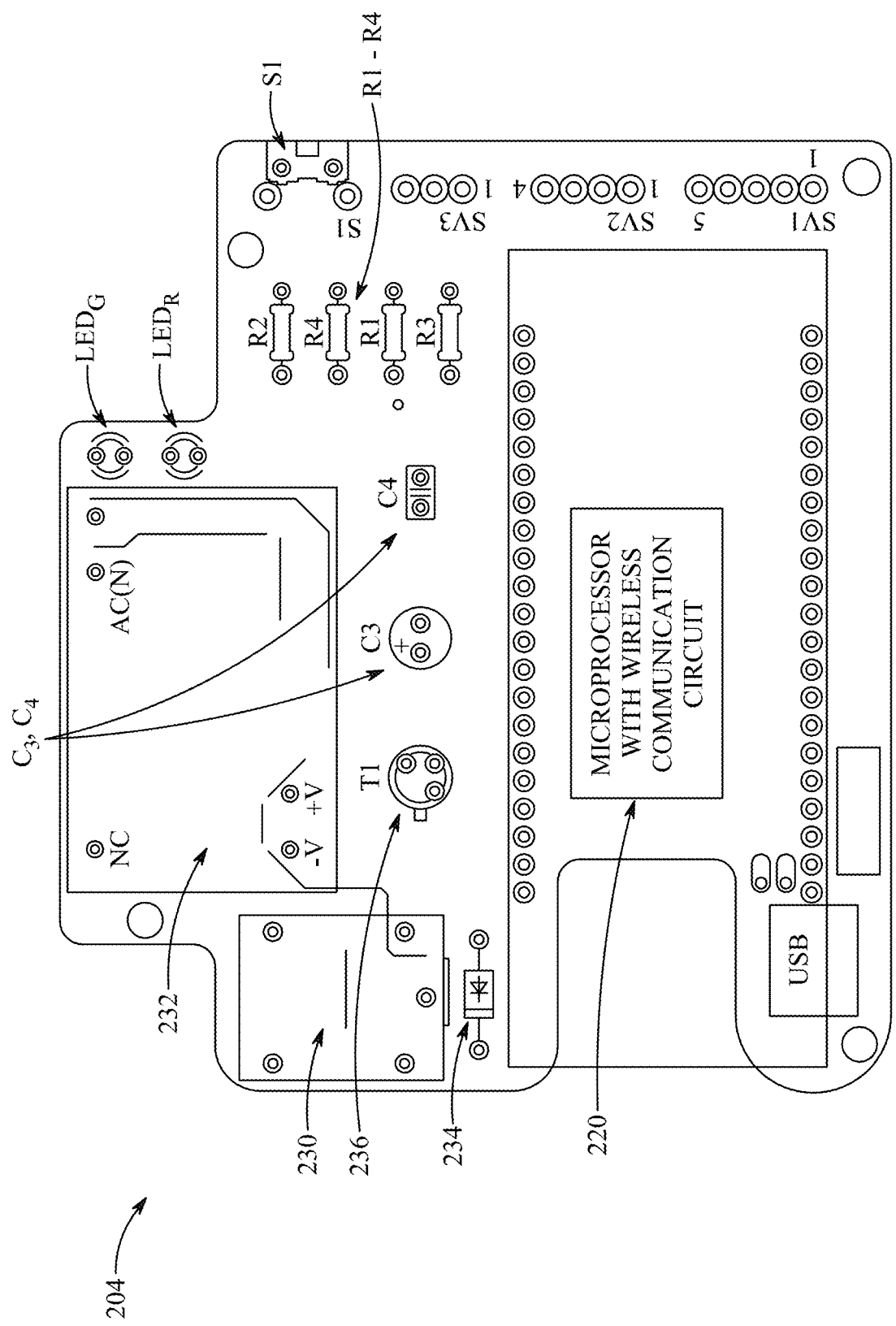
FIG. 2A illustrates the circuit board of the electronic circuit breaker, according to certain embodiments.
Figure 2B:
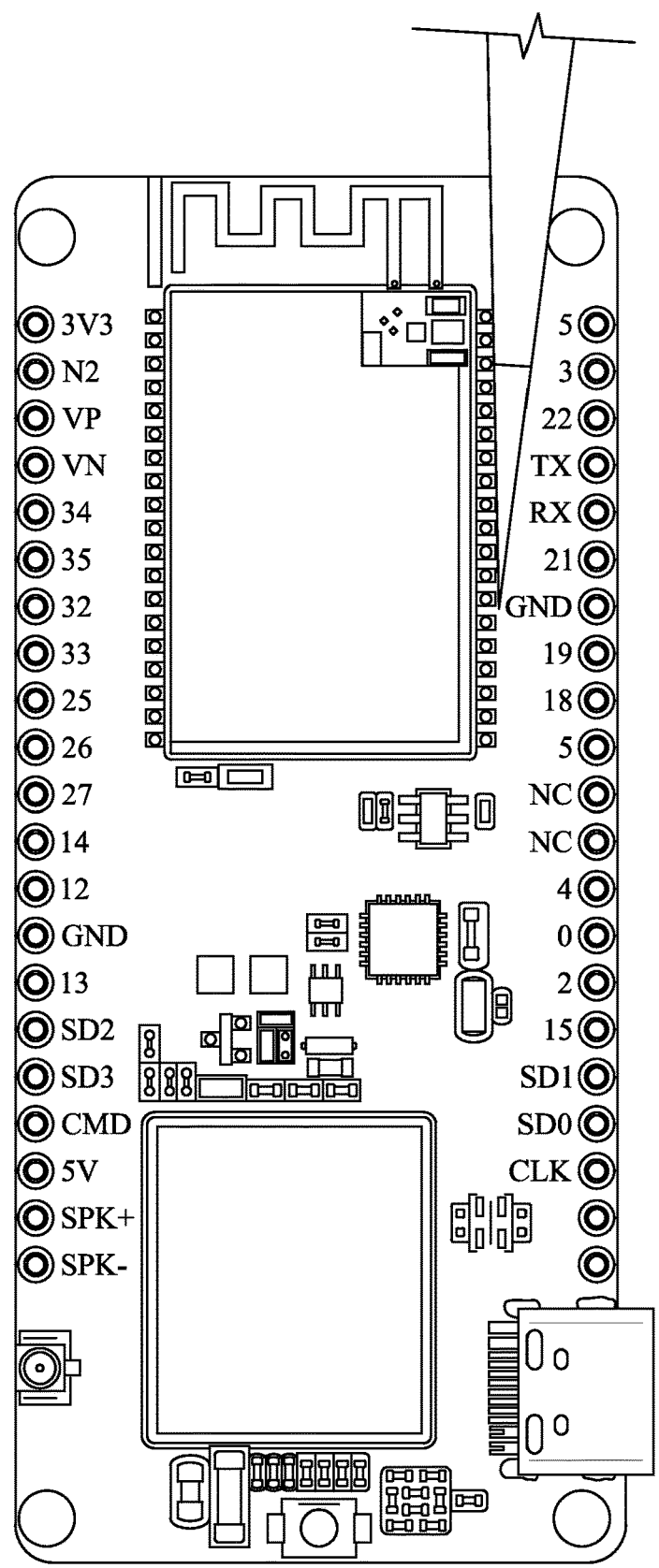
FIG. 2B shows an example of a combined microprocessor and wireless communication unit, according to certain embodiments.

As shown in FIG. 2A, the electronic board 204 includes the following:

A microprocessor (220) to control the signals. The microprocessor may include the wireless communication circuit 110 to receive the code and control signals. In a non-limiting example, as shown in FIG. 2B, the microprocessor is an ESP32 with GSM module, available from TSMC R&D Center, Fab 12B, 168, Park Ave. II, Hsinchu Science Park, Hsinchu 300-75, Taiwan, R.O.C.

A power supply 232 to convert the line power to 5 $V_{DC}$.

A relay 230 connected to the power supply and configured to switch ON or OFF according to the received control signals.

A diode 234 connected to the relay to prevent reverse current.

A transistor 236 to isolate the relay from microprocessor and switch ON or OFF according the control signal received.

Two capacitors, C3 and C4, to protect the power supply.

A group of resistors R1-R4 to be used with LEDs, transistor and push button switch.

Two LEDs green LED_G and red LED_R to show the status of the relay.

A push button switch S1 to be used manually.

A group of pins $SV1_1$-$SV1_5$, SV2 and SV3 to be used as external interface pins. FIG. 2A shows the schematic diagram for the board.

The electronic circuit breaker is connected to a wireless device via a relay that is controlled by the microprocessor 220, the wireless communication circuit 110 is connected to the app via Bluetooth™, and can also receive commands via SMS using GSM or RF packet signals sent over a cellular communication channel.

The low range wireless communication protocol used is Bluetooth Low Energy™ (BLE) using the GATT protocol for the native computer app to be able to send commands to the microprocessor. In addition, SMS commands are transmitted through the GSM protocol.

GATT is an acronym for the Generic Attribute Profile (GAP)™, and defines the way in which two Bluetooth Low Energy™ devices transfer data back and forth using concepts called Services and Characteristics. GATT makes use of a generic data protocol called the Attribute Protocol (ATT), which is used to store services, characteristics and related data in a simple lookup table using 16-bit IDs for each entry in the table. GATT is used once a dedicated connection is established between two devices, after the advertising process governed by GAP.

The connections established by GATT are exclusive. A BLE peripheral can only be connected to one central device (a mobile phone, etc.) at a time. As soon as a peripheral connects to a central device, it will stop advertising itself and other devices will no longer be able to see it or connect to it until the existing connection is broken.

SMS (short message service) is a text messaging service component of most telephone, Internet, and mobile device systems. It uses standardized communication protocols that let mobile devices exchange short text messages. The service allows users to send and receive messages of up to 160 characters (when entirely alpha-numeric) to and from GSM mobiles.

The Global System for Mobile Communications (GSM)™ is a standard developed by the European Telecommunications Standards Institute (ETSI) to describe the protocols for second-generation (2G) digital cellular networks used by mobile devices such as mobile phones and tablets.

The interface is a native mobile app with controls that send commands to the wireless communication circuit and microprocessor to control the circuit breaker. In addition, any device that can send an SMS to the wireless communications circuit can control the circuit breaker.

The wireless device may have downloaded a native computing application configured to access the electronic circuit breaker. When the personal computing device downloads the native application and registers with the native application, data such as electronic circuit breaker serial number, security code, and load may be required to set up the interface.

The code sent by the native computer application is not randomly generated like TOTP as even in TOTP, if the secret key that generates the TOTP is shared, anyone can generate the TOTP. Time-based One-time Password (TOTP) is a computer algorithm that generates a one-time password (OTP) which uses the current time as a source of uniqueness.

If a control center shares the password to access the circuit breaker it will be accessible by everybody that has the password. Therefore, in an aspect of the present disclosure, the code comprises two passwords, one stored in the control center or with the native computer application that would be used to change the password used to access the electronic circuit breaker. In this aspect, the control center is the only one that can change the password used to control the electronic circuit breaker.

Figure 3:
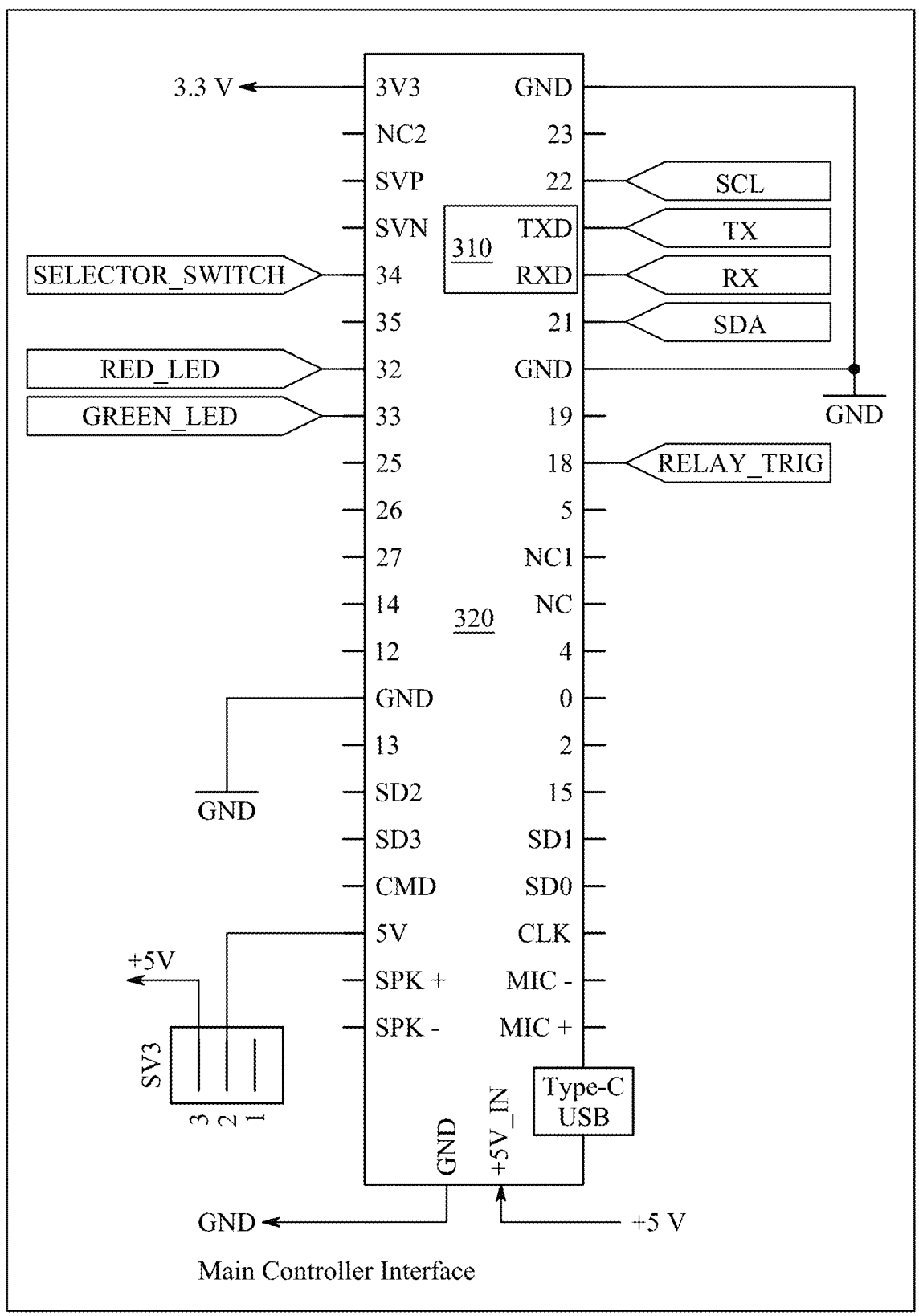
FIG. 3 is an exemplary illustration of the circuit connections to the pins of the microprocessor according to certain embodiments.

FIG. 3 shows the circuit connections to the pins of the microprocessor 320, which includes the wireless communication circuit 310. Three GND pins are used to ground the circuit. 3.3V power is provide to the relay at pin 3V3. Pin 34 connects to the selector switch, shown in more detail in FIG. 4E, which provides power to push button switch S1 of FIG. 2A. Pin 32 connects to the red LED, $LED_R$ of FIG. 2A. Pin 33 connects to the green LED, $LED_G$ of FIG. 2A. The green LED indicates that the electronic circuit breaker is ON and the red LED indicates the electronic circuit breaker is OFF. The wireless communication device 310 is connected to transmission (TXD) and receive (RXD) pins, to transmit and receive signals and data with the mobile communication device (any of 152, 154, 156) or the control center 158 shown in FIG. 1.

Pin 21 connects to the serial data line (SDA) pin 3 of an external I²C interface (see FIG. 4F) which communicates data to and from the mobile communication devices. The SDA port is a data signal port. The serial clock line (SCL) (pin 2) of FIG. 4F is the clock signal needed for timing of communications.

Figure 4A:
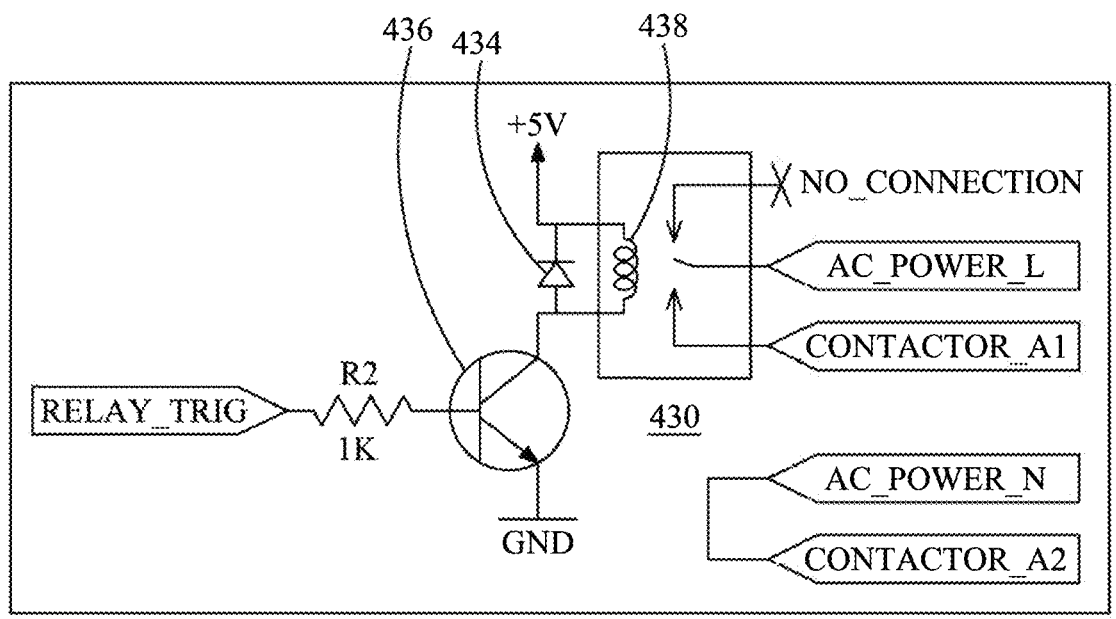
FIG. 4A is a circuit diagram of the relay circuit which provides power to the circuit breaker, according to certain embodiments.
Figure 4B:
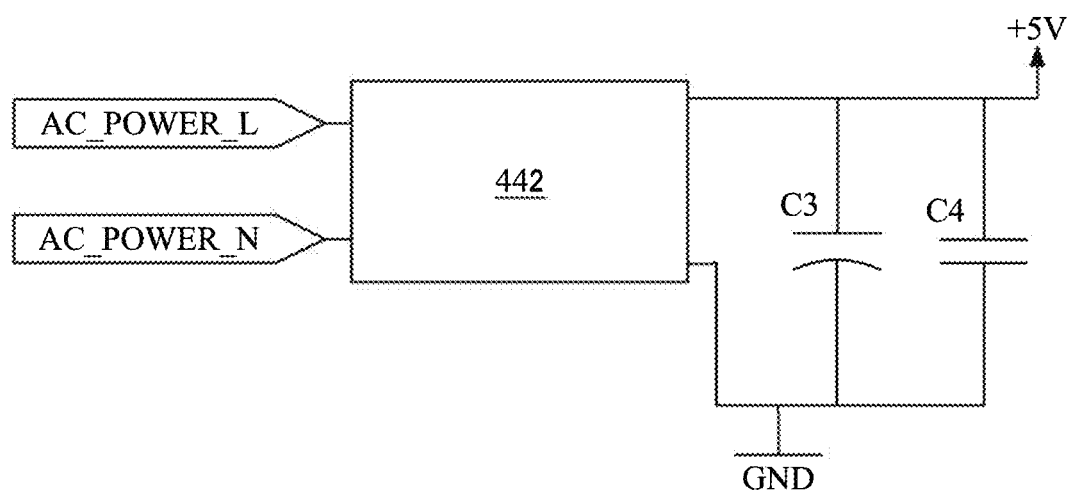
FIG. 4B is a schematic of the AC power interface, according to certain embodiments.
Figure 4C:
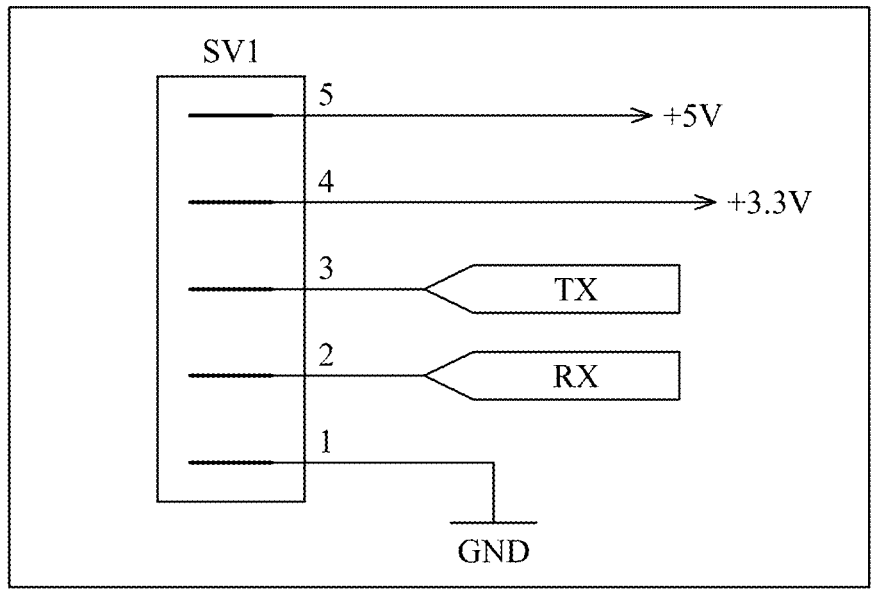
FIG. 4C is a schematic for the external pins, according to certain embodiments.
Figure 4D:
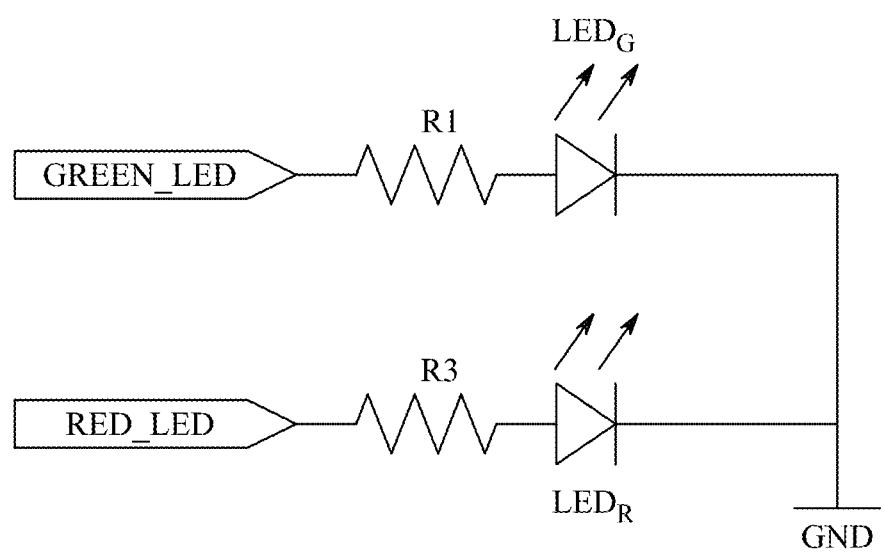
FIG. 4D is a schematic for the LED interface, according to certain embodiments.
Figure 4E:
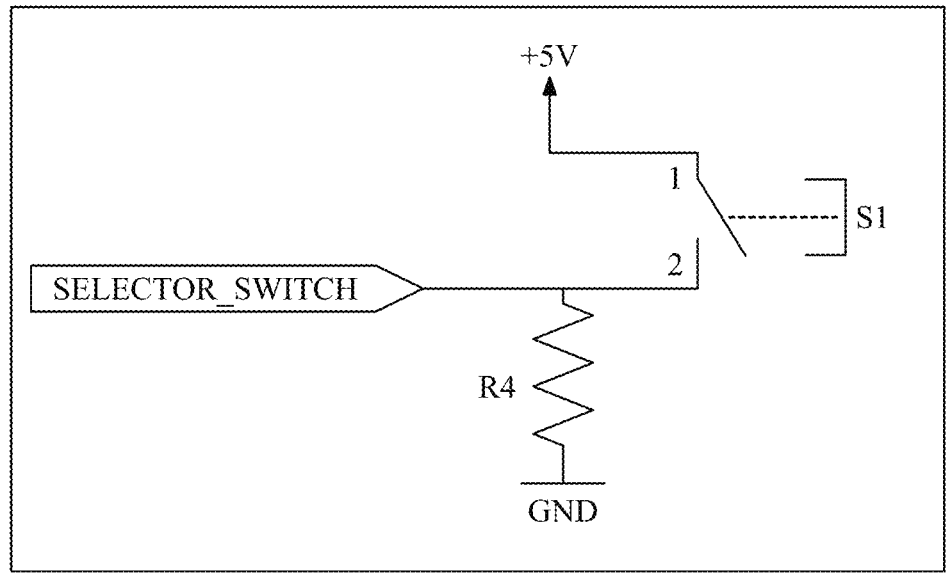
FIG. 4E shows details of the selector switch interface, according to certain embodiments.
Figure 4F:
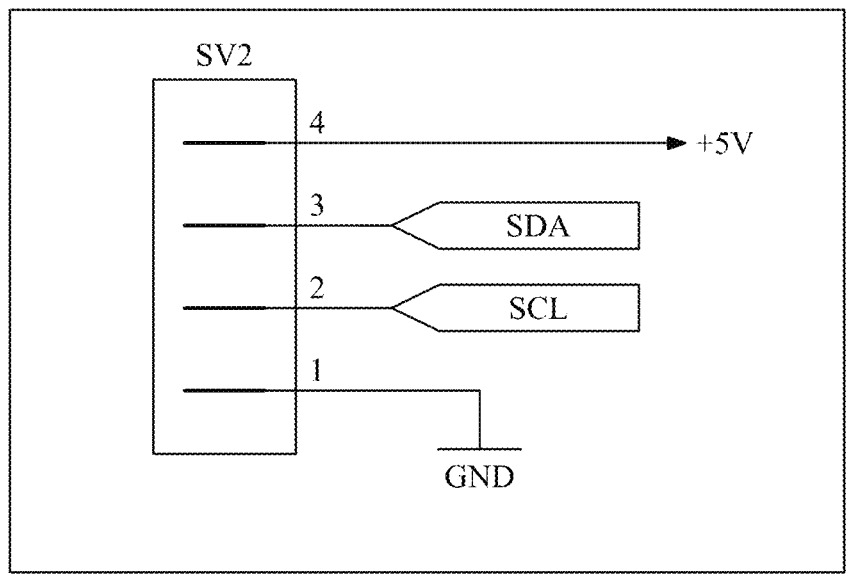
FIG. 4F shows the external I$^2$C interface, according to certain embodiments.

Pin SD1 connects to ground pin 1 of the I²C interface, pin SD2 is connected to the SCL pin 2 and pin SD4 receives +5 V from the I2C interface of FIG. 4F.

A 5V output pin connects to SV3 to provide a switchable +5 volts to the relay circuit.

A GND connection and a +5V_IN connection ground and connect +5 V respectively to the microprocessor 320.

The microprocessor may generate data regarding the operation of the electronic circuit breaker, such as voltage levels, faults or error codes. This data may be transmitted to the native mobile app.

The wireless communication circuit 110 may include an RF antenna configured for cellular communications, a low range communications antenna, a GSM antenna, a WiFi antenna and the like. WiFi antennas are tuned to different frequencies than cellular antennas. WiFi antennas use 2.4 GHz or 5.8 GHz frequencies while cellular can be 800 MHz, 900 MHz, 1800 MHz, 1900 MHz or 2100 MHz frequencies. The wireless communications circuit is configured to communicate on any of the antennas with the native mobile app. The wireless communication circuit further includes a power amplifier, a low-noise receive amplifier, and a plurality of frequency filters and circuitry for receiving and transmitting data.

FIG. 4A is a circuit diagram of the relay circuit 430 which provides power to the circuit breaker 140 of FIG. 1. The microprocessor provides a relay trigger signal at pin 18 (see FIG. 3) to the gate of transistor 436. Between the pin 18 and the gate of the transistor 436 is a resistor, R2. In a non-limiting example, the resistor is 1K Ω. Diode 434 prevents reverse current from a +5 V input from damaging the transistor 436. The transistor emitter is connected to ground. The transistor collector is connected to the diode 434. A transformer coil 438 converts the +5 volts to an AC voltage due to switching of the transistor 436. The magnetic field generated by the coil switches the contactors A1 and A2 between zero, neutral and ON states, shown at No_Connection, Contactor_A2 and Contactor_A1 respectively. When the transformer coil is energized, the coil current will generate a magnetic field, and the generated magnetic field will cause a static iron core surrounding the coil to generate electromagnetic attraction to attract a moving iron core, and drive the AC contactor to move, the normally closed contact is disconnected, and the normally open contact is closed, as the two are linked. This operates the ON/OFF switching of the circuit breaker 404.

FIG. 4B shows details of the AC power interface in which the contactor switch 442 is connected to the AC_Power_L and AC_Power_N poles of the relay 430. Two capacitors C3 and C4 are shown connected between the +5 V and ground. In a non-limiting example, C3 may be 100 µF and C4 may be 10 µF.

FIG. 4C shows an interface for the external pins of FIG. 3. Pin 1 is the ground pin, shown at the bottom of the microprocessor 320 of FIG. 3, RX at pin 2 is equivalent to the RXD pin, TX at pin 3 is equivalent to the TXD pin, pin 4 is equivalent to the 3V3 pin, and pin 5 is equivalent to the +5V_IN pin. This interface is used to integrate the microprocessor for serial communication with the other devices.

FIG. 4D shows an LED interface for the $LED_G$ and $LED_R$ of FIG. 2A. A resistor, R1, is connected between the green LED pin 33 of the microprocessor 320 of FIG. 3 and the light emitting diode $LED_G$ which is connected to ground, GND. A resistor, R3, is connected between red LED pin 32 and the light emitting diode $LED_R$ which is connected to ground, GND. The microprocessor provides voltage to either the $LED_G$ or $LED_R$ to show the ON/OFF state respectively of the electronic circuit breaker. In a non-limiting example, R1=R3=330Ω.

FIG. 4E shows details of the selector switch interface, which provides power to push button switch S1 of FIG. 2A. The selector switch signal at pin 34 of the microprocessor of FIG. 3 connects to the push on switch S1, which is connected between +5V power and a resistor, R4, which is connected to ground. In a non-limiting example, R4=10K Ω.

FIG. 4F shows an external I²C interface, which is a serial communication protocol in which data is transferred bit by bit along a single wire (the SDA line). I²C is synchronous, so the output of bits is synchronized to the sampling of bits by a clock signal shared between the microprocessor and the wireless communication circuit. This interface is an external interface which allows communication with devices which communicate through I²C, such as an LCD monitor. The clock signal is always controlled by the microprocessor. Pin 21 of the microprocessor of FIG. 3 connects to the serial data line (SDA) pin 3 of the external I²C interface (see FIG. 4F) which communicates data to and from the mobile communication devices. The SDA port is a data signal port. The serial clock line (SCL) (pin 2) of FIG. 4F is the clock signal needed for timing of communications. I²C An I²C bus consists of two signals: SCL and SDA. SCL is the clock signal, and SDA is the data signal. The clock signal is always generated by the current bus controller. I²C devices communicate at either 100 kHz or 400 kHz. There is some overhead with I²C; for every 8 bits of data to be sent, one extra bit of metadata (the "ACK/NACK" bit) must be transmitted.

Figure 4G:
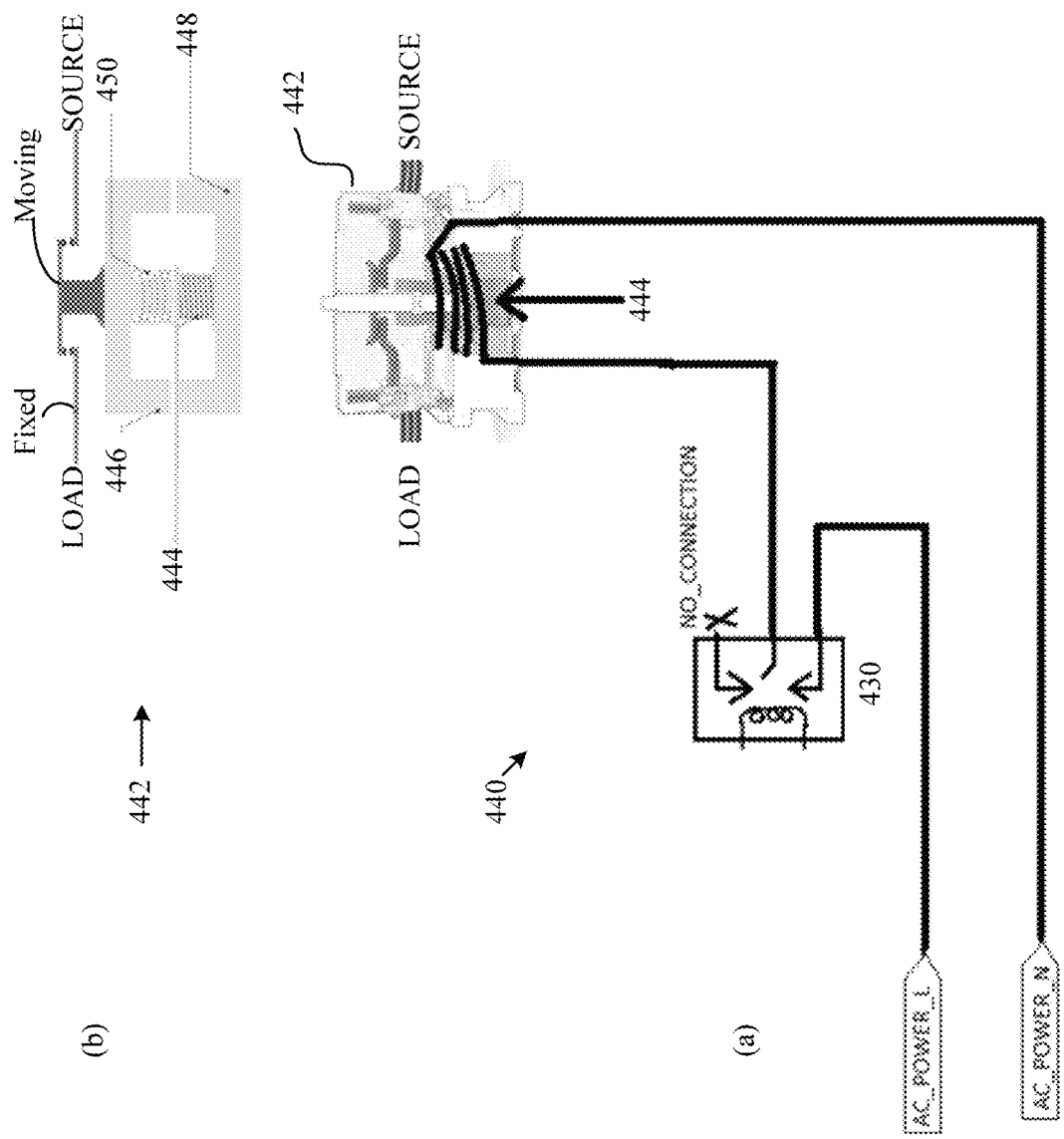
FIG. 4G shows a) the circuit breaker switch and b) the connection of the circuit breaker switch to the relay, according to certain embodiments.

FIG. 4G shows details of the contactor switch 442 of the circuit breaker 440. FIG. 4G(a) shows the details of the contactor switch 442, having a fixed contact, a moving contact, a moving magnetic core 446, a fixed magnetic core 448, a return spring 450 on the moving magnetic core and a transformer coil 444 on the center leg of the fixed magnetic core. FIG. 4G(b) shows the connections of the contactor switch to the relay 430. The AC_Power_L line is switchably connected through relay 430 to the transformer coil 444. The other end of the transformer coil is connected to AC_Power_N. The power source is connected to the moving contact side of the contactor and the load is connected to the fixed contact. When the relay is actuated to connect the transformer coil to AC_Power_L, an electromagnetic field is generated in the coil which magnetizes the fixed magnetic core. This field attracts the moving magnetic core, which connects the source line to the load line. When the relay is released, the return spring 450 translates the moving magnetic core upward, breaking the circuit connection.

Pin SD1 of FIG. 3 connects to ground pin 1 of the I²C interface, pin SD2 is connected to the SCL pin 2 and pin SD4 receives +5 V from the I2C interface of FIG. 4F.

The native mobile app is downloaded from an application store to the mobile device or the control center by the customer who wishes to control his/her electronic circuit breaker remotely. The customer registers with the native mobile app and enters the serial number of the electronic circuit breaker and the load connected to the electronic circuit breaker. The native mobile app may ask the customer to enter a security code, which it transmits to the wireless communication circuit of the electronic circuit breaker. The electronic circuit breaker may transmit data to the native mobile app indicating that the code is acknowledged. The electronic circuit breaker may transmit data to the native mobile app regarding its ON/OFF status, voltage levels, faults or error codes. The native mobile app presents an interface to the user with an icon for the electronic circuit breaker. When the user selects the icon, a display of the electronic circuit breaker, its ON/OFF status, voltage levels, and any faults or error codes are shown. The display may indicate an alert recommending that the user turn off the electronic circuit breaker if there are faults or error codes.

Alternatively, the user may need to disconnect the circuit for other reasons, such as dangerous operational conditions or a need for social distancing due to the Covid pandemic. The dangerous operational conditions may be a fire, lightning, extreme weather conditions, or the like. In another alternative, the user may decide to turn ON or OFF an appliance, such as lighting, an air conditioning system or a heating unit in their home or building. The display presents a button for turning the electronic circuit breaker ON or OFF.

When the user is within low range communication distance, the user may access the native mobile app to communicate with the electronic circuit breaker by low range communications, such as Bluetooth™. This feature is beneficial in areas where there is poor satellite coverage or WiFi access or where the mobile device does not have a subscription plan for data access.

Figure 5:
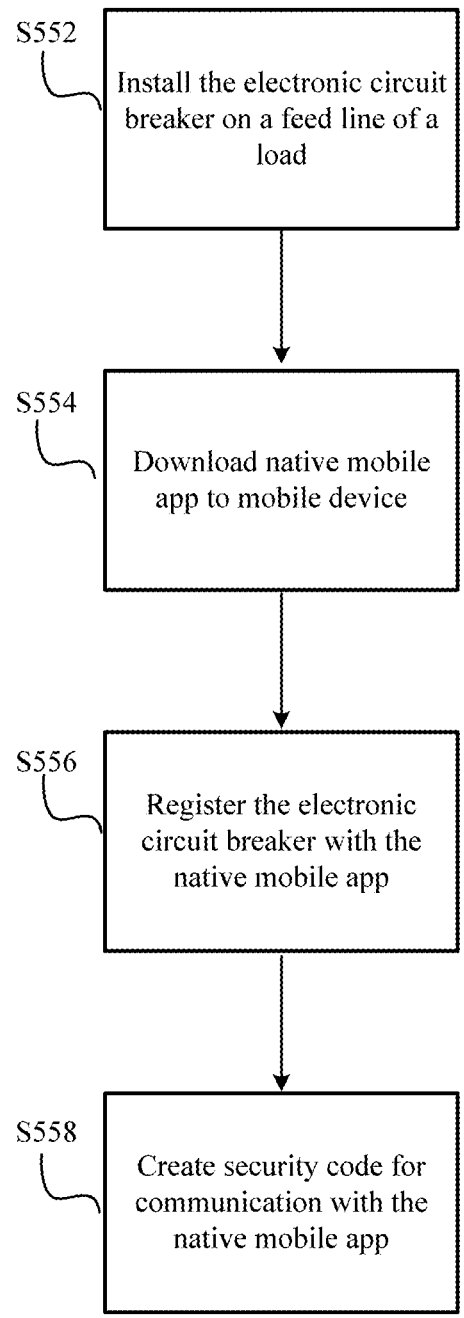
FIG. 5 is an exemplary flowchart describing the process for installing the electronic circuit breaker and registering with the native mobile app, according to certain embodiments.

FIG. 5 is a flowchart describing the process for installing the electronic circuit breaker and registering with the native mobile app.

At step S552, the user installs the electronic circuit breaker on a feed line of the load.

At step S554, the user downloads the native mobile app to the mobile device.

At step S556, the user registers the electronic circuit breaker with native mobile app by entering the serial number of the electronic circuit breaker.

At step S558, the user enters a security code on the native mobile app interface to be used for accessing the electronic circuit breaker.

Figure 6:
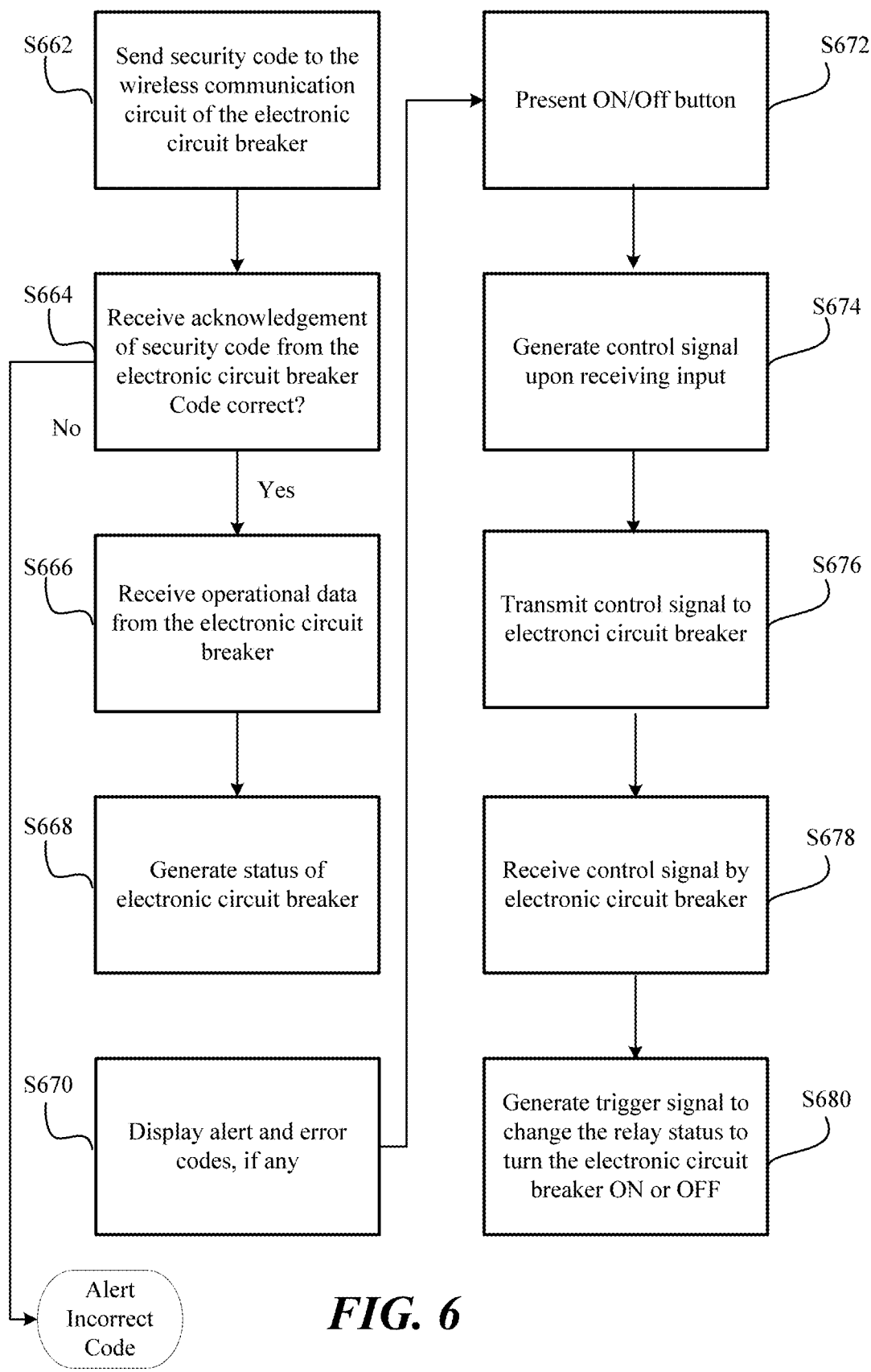
FIG. 6 is an exemplary flowchart describing the process of operating the electronic circuit breaker by a native mobile app, according to certain embodiments.

FIG. 6 is a flowchart describing the process of operating the electronic circuit breaker by a native mobile app.

At step S662, the native mobile app sends the security code to the wireless communication circuit of the electronic circuit breaker.

At step S664, the native mobile app receives acknowledgment of security code from the electronic circuit breaker if it is correct. If the code is not correct, an alert is displayed on the mobile app of an incorrect code and an email alert may be sent to the user.

At step S666, if the code is correct, the native mobile app receives operational data from the electronic circuit breaker.

At step S668, the native mobile app generates the current status of the electronic circuit breaker on the display interface.

At step S670, the native mobile app displays any alert or error codes of the electronic circuit breaker.

At step S672, the native mobile app presents an ON/OFF button.

At step S674, the native mobile app generates a control signal to turn the electronic circuit breaker ON or OFF in accordance with the user input.

At step S676, the native mobile app transmits the control signal to the electronic circuit breaker.

At step S678, the electronic circuit breaker receives the control signal.

At step S678, the microprocessor generates a trigger signal to change the relay status to turn the electronic circuit breaker ON or OFF.

Figure 7:
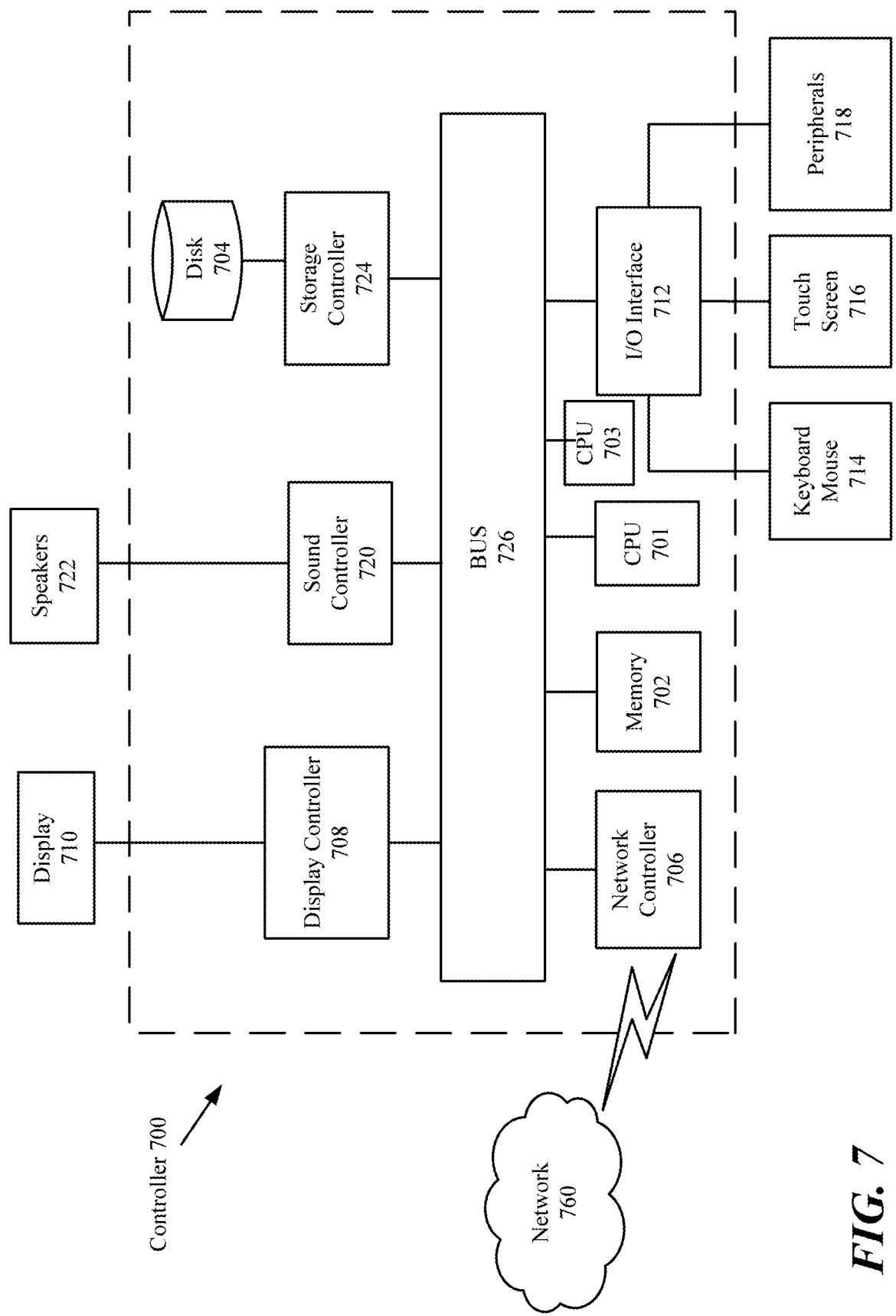
FIG. 7 is an illustration of a non-limiting example of details of computing hardware used in the computing system of the microprocessor, according to certain embodiments.

Next, further details of the hardware description of the computing environment according to exemplary embodiments is described with reference to FIG. 7. In FIG. 7, a controller 700 is described is representative of the microprocessor 320 of FIG. 3 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
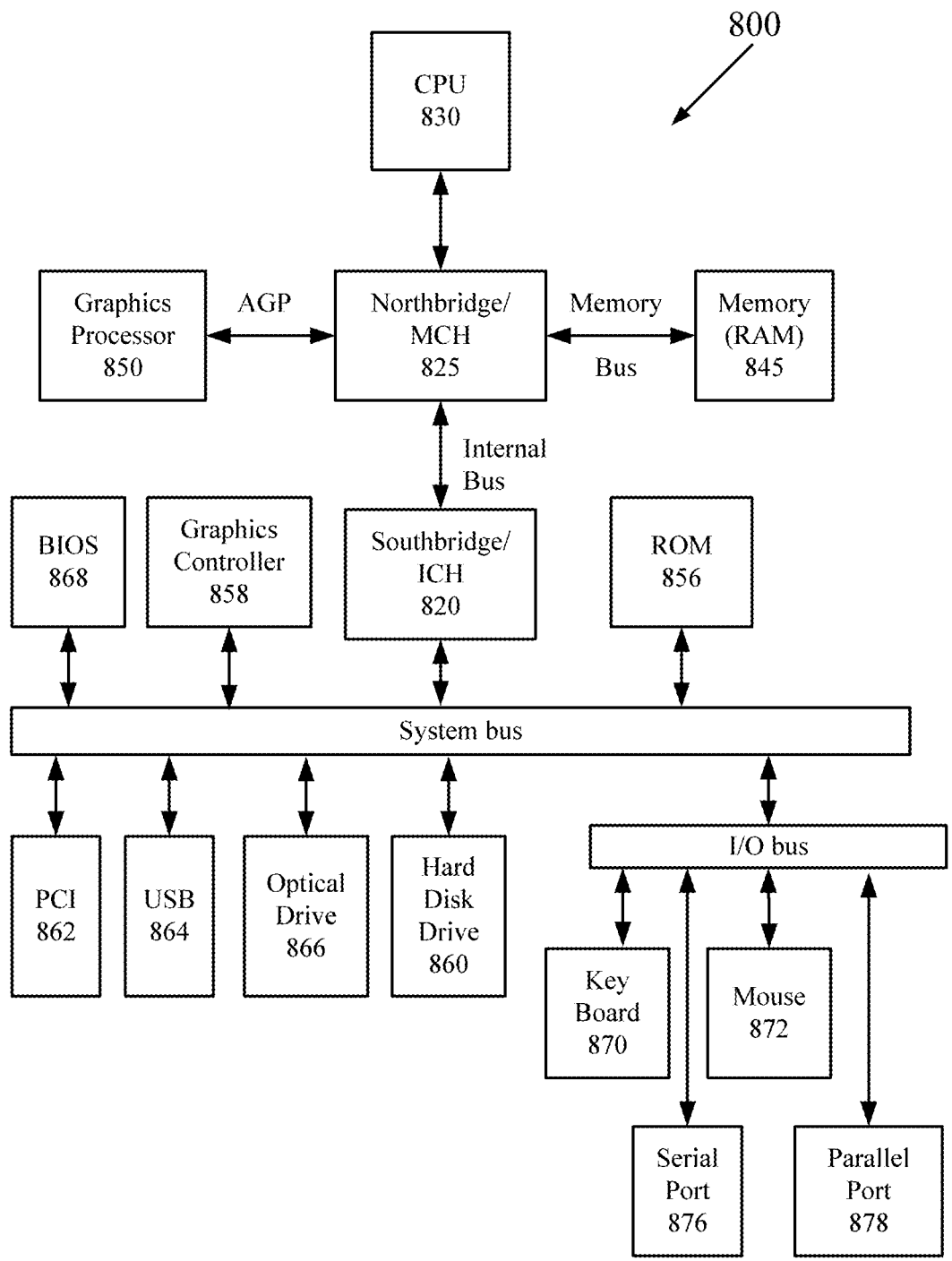
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
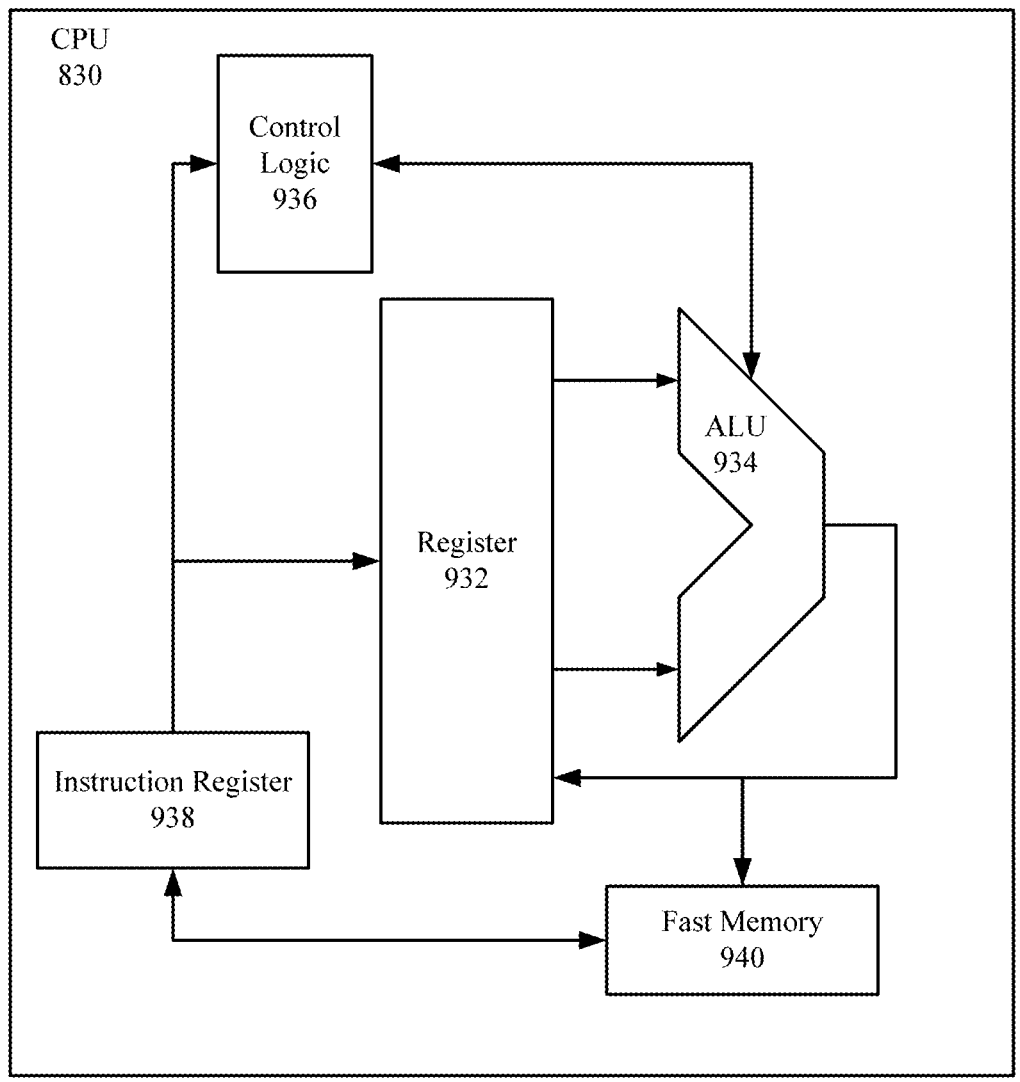
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
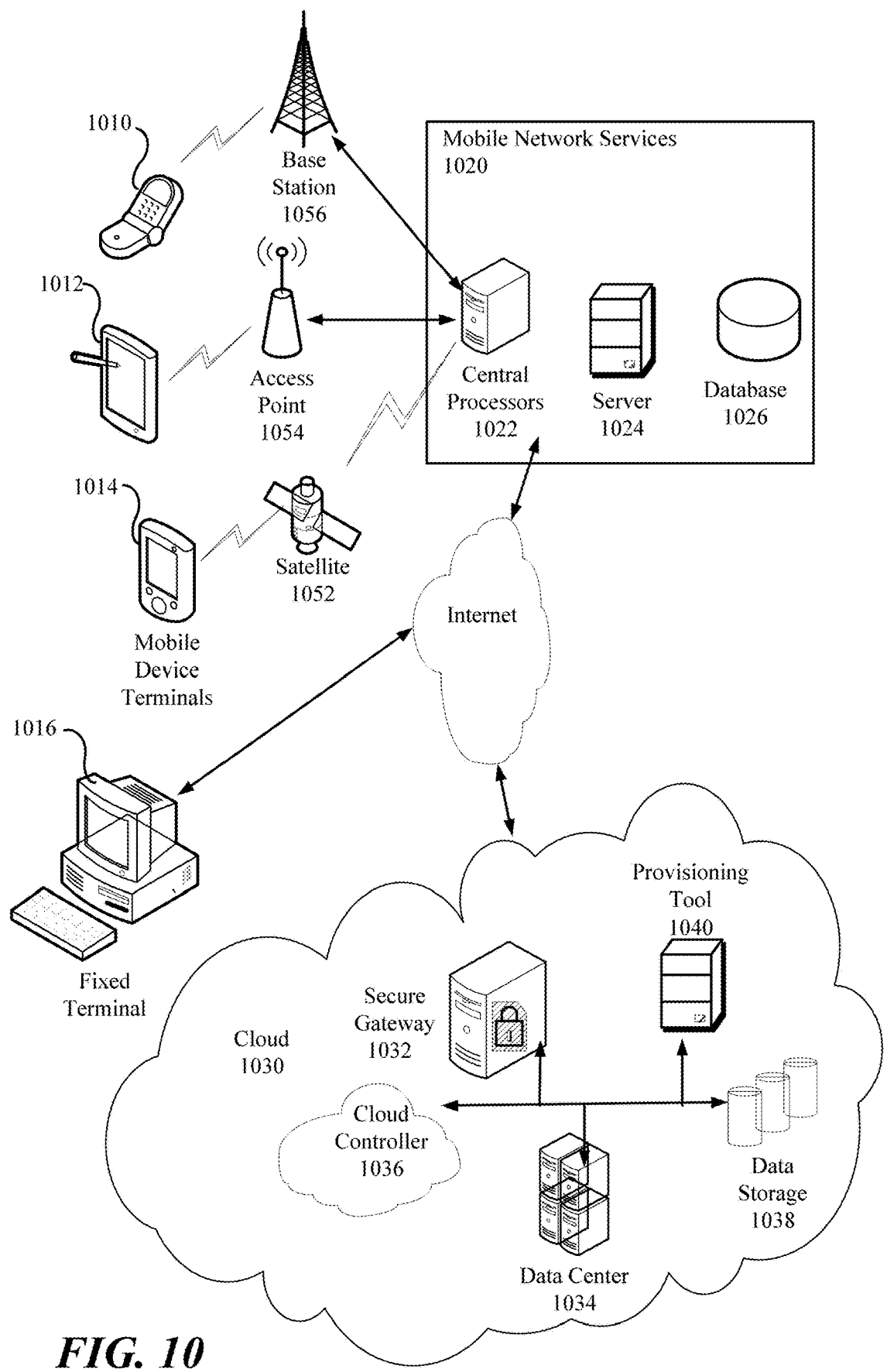
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein. an electronic circuit breaker is described comprising a circuit breaker, a circuit board including a wireless communication circuit including a plurality of antennas configured to receive a control signal, the antennas including cellular, Global System for Mobile Communications (GSM), Wi-Fi and dual-mode low range antennas, a power amplifier, a low-noise receive amplifier, a plurality of frequency filters, receiving and transmitting circuitry, a microprocessor connected to the wireless communication circuit and configured to receive the control signal and generate a trigger signal, a power supply circuit connected to the microprocessor, the power supply circuit including a first capacitor and a second capacitor, a relay connected to the power supply circuit, wherein the relay is configured to receive the trigger signal from the microprocessor and turn the circuit breaker ON or OFF based on the control signal.

In another exemplary embodiment, a method for remotely controlling an electronic circuit breaker by a native mobile app registered with the electronic circuit breaker is described, comprising, receiving, by a wireless communication circuit of the electronic circuit breaker, a control signal from the native mobile app to change the operational status of the electronic circuit breaker, transmitting the control signal to a microprocessor, determining, by the microprocessor, the operational status of the circuit breaker, generating a trigger signal by the microprocessor, and activating a relay to change the operational status based on the control signal. In another exemplary embodiment, a system for remotely controlling an electronic circuit breaker is described, comprising a smart communication device including a native mobile application, an electronic circuit breaker registered with the native mobile application, the electric load connected to the electronic circuit breaker, wherein the electronic circuit breaker includes a circuit breaker connected to an electric load, a circuit board including, a wireless communication circuit including a plurality of antennas configured to receive a control signal from the native mobile app, the antennas including cellular, Global System for Mobile Communications (GSM), Wi-Fi and dual-mode low range antennas, a power amplifier, a low-noise receive amplifier, a plurality of frequency filters, receiving and transmitting circuitry, a microprocessor connected to the wireless communication circuit and configured to receive the control signal and generate a trigger signal, a power supply circuit connected to the microprocessor, the power supply circuit including a first capacitor and a second capacitor configured to protect the power supply circuit from sudden changes in voltage, a relay connected to the power supply circuit, wherein the relay is configured to receive the trigger signal from the microprocessor and generate a magnetic force to turn the circuit breaker ON or OFF based on the control signal.

The invention claimed is:

1. An electronic circuit breaker, comprising:
a circuit breaker;
a circuit board including:
  a wireless communication circuit including
  a plurality of antennas configured to receive a control signal, the antennas including cellular, digital cellular network, wireless networking and dual-mode low range antennas;
  a power amplifier;
  a low-noise receive amplifier;
  a plurality of frequency filters;
  receiving and transmitting circuitry;
a microprocessor connected to the wireless communication circuit and configured to receive the control signal and generate a trigger signal;
a power supply circuit connected to the microprocessor, the power supply circuit including a first capacitor and a second capacitor;
a relay circuit connected to the power supply circuit, wherein the relay circuit is configured to receive the trigger signal from the microprocessor and turn the circuit breaker ON or OFF based on the control signal, wherein the relay circuit comprises
  a first resistor connected to the microprocessor at a trigger signal pin;
  a transistor having a gate connected to the first resistor, the gate configured to receive a trigger signal which turns the transistor ON or OFF;
  a reverse biased diode connected between a power source and a collector of the transistor;
  aground connected to an emitter of the transistor;
  a transformer connected in parallel with the reverse biased diode, the transformer configured to generate a magnetic field when the transistor switch is ON; and
  a magnetic contactor circuit configured to switch a contactor between ON, OFF and neutral states in response to the magnetic field.

2. The electronic circuit breaker of claim 1, the microprocessor further comprising:
a first pin connected to a second resistor, the second resistor connected to a green LED;
a second pin connected to a third resistor, the third resistor connected to a red LED; and
wherein the microprocessor is configured to generate either a voltage at the first pin when the electronic circuit breaker is ON or a voltage at the second pin when the electronic circuit breaker is OFF.

3. The electronic circuit breaker of claim 2, wherein
the first capacitor is connected between the power supply and ground; and
the second capacitor is connected in parallel with the first capacitor.

4. The electronic circuit breaker of claim 3, the circuit board further comprising:
a push button switch connected to the power supply;
a fourth resistor connected between the push button switch and ground;
the push button switch connected to a selector switch pin of the microprocessor, wherein the push button switch is configured to generate a voltage at the selector switch pin of the microprocessor; and
wherein the microprocessor is configured to turn on the electronic circuit breaker upon receiving the voltage at the selector switch pin.

5. The electronic circuit breaker of claim 1, the microprocessor further comprising:
a receive pin configured for receiving data communication signals from a native mobile app registered with the electronic circuit breaker; and
a transmit pin configured for transmitting data communication signals to the native mobile app.

6. A method for remotely controlling an electronic circuit breaker by a native mobile app registered with the electronic circuit breaker, comprising:
receiving, by a wireless communication circuit of the electronic circuit breaker, a control signal from the native mobile app to change the operational status of the electronic circuit breaker;
transmitting the control signal to a microprocessor;
determining, by the microprocessor, the operational status of the circuit breaker;
generating a trigger signal by the microprocessor;
activating a relay circuit to change the operational status based on the control signal,
receiving, by the wireless communication circuit, a security code from the native mobile app;
transmitting the security code to the microprocessor;
determining, by the microprocessor, whether the security code matches a stored security code;
when the security code matches the stored security code, sending an acknowledgment message from the microprocessor to the wireless communication circuit;
when the security code does not match the stored security code, sending a denial message from the microprocessor to the wireless communication circuit;
transmitting the acknowledgment or denial to the native mobile app;
determining, by the microprocessor, a power supply level of the electronic circuit breaker;

determining, by the microprocessor, an error code when the power supply level is below a rated level;

generating, by the microprocessor, an alert message including the power supply level and the error code; and transmitting, by the wireless communication circuit, the alert message to the native mobile app.

7. The method of claim 6, further comprising:

depressing a push button switch connected to a selector switch pin of the microprocessor, wherein depressing the push button switch connects the power supply to the selector switch pin and changes the operational status of the electronic circuit breaker.

8. The method of claim 7, further comprising:

receiving the control signal on a dual mode, low range antenna of the wireless communication circuit.

9. The method of claim 7, further comprising:

receiving, by a digital cellular network, the control signal as a short message.

10. The method of claim 7, further comprising:

receiving the control signal on a frequency band tuned to a cellular communication frequency, wherein the frequency is selected from the group comprising 800 MHz, 900 MHz, 1800 MHz, 1900 MHz and 2100 MHz.

11. The method of claim 7, further comprising:

receiving the control signal on an antenna tuned to a 2.4 GHz frequency.

12. The method of claim 7, further comprising:

receiving the control signal on an antenna tuned to a 5.8 GHz frequency.

13. An electronic circuit breaker, comprising:

a circuit breaker;

a circuit board including:
  a wireless communication circuit including
    a plurality of antennas configured to receive a control signal, the antennas including cellular, digital cellular network, wireless networking and dual-mode low range antennas;
    a power amplifier;
    a low-noise receive amplifier;
    a plurality of frequency filters;
    receiving and transmitting circuitry,
  a microprocessor connected to the wireless communication circuit and configured to receive the control signal and generate a trigger signal;
  a power supply circuit connected to the microprocessor, the power supply circuit including a first capacitor and a second capacitor;
  a relay circuit connected to the power supply circuit, wherein the relay circuit is configured to receive the trigger signal from the microprocessor and turn the circuit breaker ON or OFF based on the control signal, wherein the wireless communication circuit further comprises:
  an inter-integrated circuit ($I^2C$) interface configured to communicate data and a clock signal between the microprocessor and the wireless communication circuit, wherein the $I^2C$ circuit is connected between the power supply and ground;
  the $I^2C$ circuit including
    a first input connection connected to a serial data line (SDA) pin of the microprocessor; and
    a second input connection connected to a serial clock line (SCL) of the microprocessor.

* * * * *